April 27, 1971
G. VAGHI
3,576,934
TREATMENT OF POLYMERIC MATERIALS
Filed Dec. 26, 1968
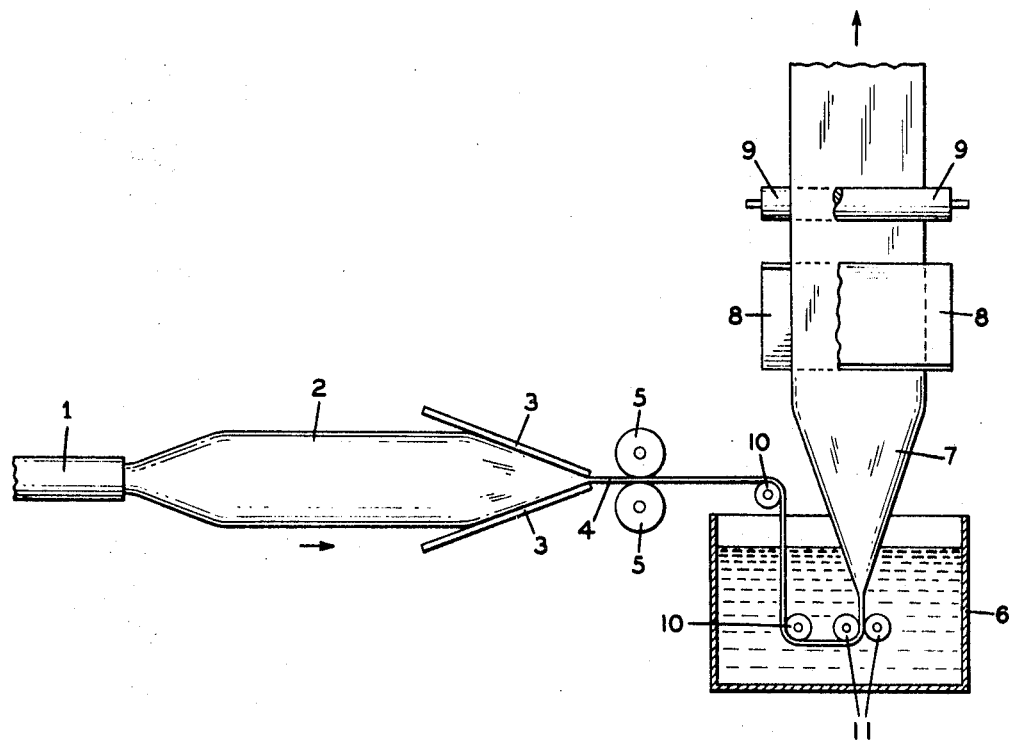

United States Patent Office 3,576,934
Patented Apr. 27, 1971

3,576,934
TREATMENT OF POLYMERIC MATERIALS
Giordano Vaghi, Milan, Italy, assignor to Allied Chemical Corporation, New York, N.Y.
Filed Dec. 26, 1968, Ser. No. 787,010
Int. Cl. B29d 7/24
U.S. Cl. 264—95
3 Claims

ABSTRACT OF THE DISCLOSURE

Biaxially oriented tubular films, having a uniform thickness and orientation, are prepared by a novel process wherein two pairs of driven draw nip rollers, positioned at right angles and in different planes with respect to each other, are used to effect a longitudinal stretch, while simultaneously expanding the film diameter to effect a transverse orientation and additional longitudinal orientation.

BACKGROUND OF THE INVENTION

This invention relates to a continuous process for preparing biaxially oriented tubular films, wherein two pairs of driven draw nip rollers, positioned at right angles and in different planes with respect to each other, are used to effect a longitudinal stretch, without causing stress weakness or thickness variations in the film, while simultaneously expanding the film diameter to effect a transverse orientation and additional longitudinal orientation.

It is found that tubular films exhibiting a high degree of impact resistance and tensile strength are achieved by subjecting an article, such as polyvinyl chloride, which already exhibit substantially molecular orientation as a result of biaxial stretching of the molten polymer during extrusion blowing to a further drawing operation in which biaxial tension is applied to the tubing at substantially lower temperatures. Illustrative of this procedure is a process wherein an article of tubular polyvinyl chloride may first be extruded and biaxially stretched, thereby producing substantialy molecular orientation, and subsequently collapsed and redrawn by a further biaxial stretching operation and recollapsed. It is, however, clear that repeated drawing and pressing along the same film crease causes a stress weakness along said crease, without assuring a uniform thickness about the circumference of a tubular film.

It is an object of this invention to produce a biaxially oriented tubular film, without causing stress weakness or thickness variations.

It is a more specific object of this invention to produce a biaxially oriented, tubular film which exhibits a uniform thickness of solid, high molecular weight polymer, the orientation of said polymer being uniform about the circumference of said tubular film.

Other objects and advantages of my invention will become apparent from the following detailed description thereof.

SUMMARY OF THE INVENTION

My process of producing biaxially oriented films applies a tubular stretching process in which two pairs of driven draw nip rollers used to effect a longitudinal stretch are positioned at right angles and in different planes with respect to each other, while simultaneously expanding the film diameter to effect a transverse orientation and additional machine direction orientation.

In blown film extrusion, the extruder imparts an initial longitudinal orientation as well as a transverse orientation, the relative degree depending primarily on the draw ratio (die opening to film gage) and the blow-up ratio (die diameter/bubble diameter). The techniques of blown film extrusion are more fully discussed in conjunction with the description of preferred embodiments.

In the past it has been generally recognized that the film gage has been more uniform in cast film than in blown film, however, my process substantially alleviates this problem by expanding the film twice and collapsing the blown film each time along different circumferential edges by positioning blowing means at right angle and in different planes with respect to each other, said drawing means being situated beyond the collapsing means but in close proximity to said collapsing means.

It is also well-recognized in the art that cast film has not approached blown film in the degree to which it can be uniformly oriented. This uniform orientation is desirable for maximum impact resistance and tensile strength. By the process of our invention, it is possible to produce tubular film uniformly oriented about the circumference, since initial transverse and longitudinal orientations are imparted to a film forming resin in a molten state, and subsequent transverse and longitudinal orientations are imparted to the film at controlled lower temperatures.

Adoption of my process results in much desired and simply achieved tubular film, which is of uniform thickness and uniformly oriented about the circumference.

DESCRIPTION OF THE PREFERRED EMBODIMENTS

My process may be applied to diverse polymeric based films, for example, polyethylene, polypropylene, polyvinylidene chloride and polyvinyl chloride films. However, we prefer to apply our process to polyvinyl chloride films in an effort to maximize results. It may be applied to other blown polymeric films, such as nylon blown films, or polyester blown films, if desired.

The significant features of our process can be most fully disclosed when presented in conjunction with FIG. 1.

The molten polyvinyl chloride resinous extrudate, used for illustrative purposes in this example, is pumped from the extruder into a ring-shaped die 1, thereafter it is extruded through the annular die opening in the form of a comparatively thick-walled tube and while still in the molten state, the material is expanded to a "bubble" 2 a hollow cylinder of desired diameter and correspondingly lower wall thickness. This expansion is accomplished by the pressure of internal gas admitted through the center of the mandrel (not shown) contained in the die. Once the bubble has been formed for the desired lay-flat width, no additional gas is required to keep the bubble and its diameter stable.

The bubble, after several feet of free suspension is gradually flattened 4 by means of a collapsing canopy 3 and passed through a first set of draw nip rollers 5, operating co-currently with respect to the film therein passing between the rollers, said rollers maintaining a rotational speed which is somewhat faster than the speed of which the extruded film emerges, wherein an initial orientation is imparted to the film between the die 1 and the first set of draw nip rollers 5. Upon emerging from the draw rollers the collapsed tubular film is passed over a series of guide rolls 10 into a temperature controlled water tank 6, through a second set of draw nip rollers 11 situated in said water tank, said second set of draw nip rollers maintaining a rotational speed which may be slightly faster than the speed of the first set of draw nip rollers and upon emerging from the second set of draw nip rollers the film is re-inflated 7 by means of a gaseous medium. The inflated tubular film 7, having a larger diameter than tubular cylinder 2, then being drawn through a third set of draw rollers 9, which rollers are situated as to be directionally perpendicular to and in a plane different than the second named set of draw rollers 11. The draw rollers 9 rotate co-currently with respect to the film therein passing through, maintaining a faster rotational speed than the second set of draw nip rollers 11, thereby imparting additional longitudinal orientation.

As a result of the instant process, gage uniformity is achieved without concomitant stress weakness. The physical properties of the film can be made practically equal in all directions. This balance of properties is achieved since the extrusion blowing step and first set of nip draw rollers respectively impart a transverse and longitudinal orientation to the molten resin; whereupon the film is re-inflated such that the diameter of the second "bubble" 7 is larger than the first 2, thereby imparting a further transverse orientation and increasing the machine direction orientation, while simultaneously drawing the tubular film through a set of draw nip rollers juxtaposed such that the film is creased along a different circumferential edge. It is well known that such a balance of properties gives maximum toughness to the film.

According to my process the aforementioned orientations are imparted to the film without causing stress weakness or thickness variations in the film, since the film is twice drawn through draw rollers but along different circumferential edges.

While the present invention has been described in detail with respect to specific embodiments thereof, it is not intended that these embodiments circumscribe the invention except as it is limited by the claims.

I claim:

1. In a process for producing tubular film by a blown film extrusion method, wherein a biaxial orientation is imparted to said film, the improvement comprising the step of positioning two pairs of draw nip rollers at right angles with respect to each other in different planes to effect a longitudinal stretch, the sets of said rollers lying in parallel planes.

2. A process for preparing biaxially oriented film comprising, forming a molten thermoplastic extrudate; expanding the extrudate to a hollow cylinder by gaseous pressure; passing the expanded extrudate through a collapsing canopy; stretching the flattened film emerging from the canopy between a set of draw rollers operating co-currently with respect to the film passing therebetween, said rollers maintaining a rotational speed which is faster than the speed at which the extruded film emerges; passing the stretched film over a series of guide rolls into a temperature controlled bath, stretching the film between a second set of draw rollers operating co-currently with respect to the film passing therebetween, said rollers maintaining a rotational speed which is faster than the speed of the first set of draw rollers; re-inflating the tubular film; collapsing the inflated film through a collapsing frame; and drawing the film through a third set of draw rollers, situated as to be directionally perpendicular to the second named set of draw rollers and in a different plane with respect to the second named set of draw rollers, said third set of draw rollers rotating co-currently to the film therein passing through, and maintaining a faster rotational speed than the second set of draw rollers.

3. A process for preparing biaxially oriented tubular film comprising, forming a molten polyvinyl chloride; expanding the extrudate to a hollow cylinder by air pressure; passing the expanded extrudate through a collapsing canopy; stretching the flattened film emerging from the canopy between a set of draw rollers operating co-currently with respect to the film passing therebetween, said rollers maintaining a rotational speed which is faster than the speed at which the extruded film emerges; passing the stretched film over a series of guide rolls into a temperature controlled bath; stretching the film between a second set of draw rollers situated within said water tank; operating co-currently with respect to the film passing therebetween, said rollers maintaining a rotational speed which is faster than the speed of the first set of draw rollers; re-inflating the tubular film; collapsing the inflated film through a collapsing frame; and drawing the film through a third set of draw rollers, situated as to be directionally perpendicular to the second named set of draw rollers and situated in a different plane with respect to the second named set of draw rollers, said third set of draw rollers rotating co-currently to the film therein passing through, and maintaining a faster rotational speed than the second set of draw rollers.

References Cited

UNITED STATES PATENTS 3,217,359   11/1965   Euling     264—95X

FOREIGN PATENTS 866,822   5/1961   Great Britain     264—99
1,233,575   2/1967   Germany     264—95

ROBERT F. WHITE, Primary Examiner

T. J. CARVIS, Assistant Examiner

U.S. Cl. X.R.

18—14